United States Patent
Felgate

(10) Patent No.: US 9,460,448 B2
(45) Date of Patent: Oct. 4, 2016

(54) ENVIRONMENTAL MONITORING SYSTEM WHICH LEVERAGES A SOCIAL NETWORKING SERVICE TO DELIVER ALERTS TO MOBILE PHONES OR DEVICES

(75) Inventor: Arthur Everett Felgate, Richfield, MN (US)

(73) Assignee: NimbeLink Corp., Plymouth, MN (US)

( * ) Notice: Subject to any disclaimer, the term of this patent is extended or adjusted under 35 U.S.C. 154(b) by 926 days.

(21) Appl. No.: 13/052,070

(22) Filed: Mar. 19, 2011

(65) Prior Publication Data

US 2011/0230160 A1 Sep. 22, 2011

Related U.S. Application Data

(60) Provisional application No. 61/340,730, filed on Mar. 20, 2010.

(51) Int. Cl.
*H04W 4/00* (2009.01)
*G06Q 30/02* (2012.01)

(52) U.S. Cl.
CPC ............... *G06Q 30/0224* (2013.01)

(58) Field of Classification Search
CPC ................ H04W 4/14; H04W 4/12
USPC ........................................ 455/466
See application file for complete search history.

(56) References Cited

U.S. PATENT DOCUMENTS

| | | | |
|---|---|---|---|
| 5,615,266 A | 3/1997 | Altschuler et al. | |
| 5,790,407 A | 8/1998 | Strickland et al. | |
| 6,181,244 B1 | 1/2001 | Hall et al. | |
| 6,630,754 B1 * | 10/2003 | Pippin ..................... | G05F 3/265 307/117 |
| 6,831,557 B1 | 12/2004 | Hess | |
| 6,864,789 B2 | 3/2005 | Wolfe | |
| 6,987,457 B2 | 1/2006 | Yin et al. | |
| 7,747,705 B1 * | 6/2010 | Raja ..................... | G06Q 10/107 709/201 |
| 2003/0063003 A1 * | 4/2003 | Bero et al. ................. | 340/573.1 |
| 2005/0200475 A1 * | 9/2005 | Chen ..................... | G08B 17/10 340/521 |
| 2006/0095165 A1 | 5/2006 | Hackel et al. | |
| 2007/0214180 A1 * | 9/2007 | Crawford ................... | 707/104.1 |
| 2007/0214264 A1 | 9/2007 | Koister | |
| 2007/0244653 A1 | 10/2007 | Maurer et al. | |
| 2008/0057916 A1 * | 3/2008 | Gamm et al. .............. | 455/414.1 |
| 2008/0064413 A1 * | 3/2008 | Breed ......................... | 455/456.1 |
| 2008/0155080 A1 | 6/2008 | Marlow et al. | |
| 2008/0207232 A1 * | 8/2008 | Rice .................. | G06F 17/30893 455/466 |
| 2009/0089612 A1 | 4/2009 | Mathew et al. | |
| 2009/0117942 A1 * | 5/2009 | Boningue ......... | H04M 1/72547 455/564 |
| 2009/0141899 A1 | 6/2009 | Huang et al. | |
| 2009/0144369 A1 * | 6/2009 | Brown .......................... | 709/205 |

(Continued)

FOREIGN PATENT DOCUMENTS

WO 2011011404 A1 1/2011

*Primary Examiner* — Suhail Khan
(74) *Attorney, Agent, or Firm* — Christensen Fonder P.A.

(57) ABSTRACT

A system for remote monitoring of environmental conditions at a site and transmitting alerts to interested parties' mobile devices via a social networking service is described. The system employs a wireless communications device, partially exposed outside a small, metal enclosure, to transmit SMS (text message) alerts to a social networking site. Interested parties, including other devices, receive the alerts by simply subscribing to the 'user' device. Thus, no configuration of the device by interested parties is required. Temperature alerts are generated by the device without user-configured or fixed thresholds. A wall-mounted installation of the device conceals the external antenna within the wall cavity.

24 Claims, 5 Drawing Sheets

(56) References Cited

U.S. PATENT DOCUMENTS

| | | | |
|---|---|---|---|
| 2009/0156254 A1* | 6/2009 | Montes | H04M 1/0202 455/558 |
| 2009/0172773 A1 | 7/2009 | Moore | |
| 2009/0187120 A1 | 7/2009 | Nycz | |
| 2009/0264140 A1* | 10/2009 | Bain | 455/466 |
| 2009/0278681 A1* | 11/2009 | Brown | 340/539.22 |
| 2009/0300525 A1 | 12/2009 | Jolliff et al. | |
| 2009/0321039 A1 | 12/2009 | Therrien et al. | |
| 2009/0326981 A1 | 12/2009 | Karkanias et al. | |
| 2010/0005152 A1* | 1/2010 | Ramamurthy | G06Q 10/10 709/217 |
| 2010/0030578 A1* | 2/2010 | Siddique et al. | 705/3 |
| 2010/0056944 A1 | 3/2010 | Keith et al. | |
| 2010/0107661 A1 | 5/2010 | Awwad et al. | |
| 2010/0127880 A1 | 5/2010 | Schechter et al. | |
| 2010/0174709 A1* | 7/2010 | Hansen et al. | 707/728 |
| 2010/0231445 A1 | 9/2010 | Tarlow | |
| 2010/0248681 A1* | 9/2010 | Phills | 455/404.2 |
| 2010/0273517 A1 | 10/2010 | Pinheiro et al. | |
| 2010/0299615 A1 | 11/2010 | Miluzzo et al. | |
| 2011/0015802 A1 | 1/2011 | Imes | |

* cited by examiner

ENVIRONMENTAL MONITORING SYSTEM WHICH LEVERAGES A SOCIAL NETWORKING SERVICE TO DELIVER ALERTS TO MOBILE PHONES OR DEVICES

CROSS REFERENCE TO RELATED APPLICATIONS

The application listed below is the only application related to this application. This application claims benefit of the earlier filing date under 35 USC 119(e) of provisional application No. 61/340,730 filed on Mar. 20, 2010.

STATEMENT REGARDING FEDERALLY SPONSORED RESEARCH OR DEVELOPMENT

No invention claimed in this application was made under Federally sponsored research or development.

THE NAMES OF THE PARTIES TO A JOINT RESEARCH AGREEMENT

Not Applicable

REFERENCE TO A SEQUENCE LISTING

Not Applicable

BACKGROUND OF THE INVENTION

The present invention is in the technical field of industrial and home automation. More particularly, the present invention is in the technical field of automatic alarm dialers. The prior art in such technical field includes public telephone-or-cellular-based voice dialers that notify end-users directly via phone call or that report data to an interactive alarm processor. Existing remote notification systems all require at least some user programming of configuration data, including alarm thresholds.

BRIEF SUMMARY OF THE INVENTION

The present invention is an environmental monitoring system which wirelessly transmits alerts directly to a social networking site and eliminates the need for user-configuration or fixed temperature thresholds.

DETAILED DESCRIPTION OF THE INVENTION

Figure 1:
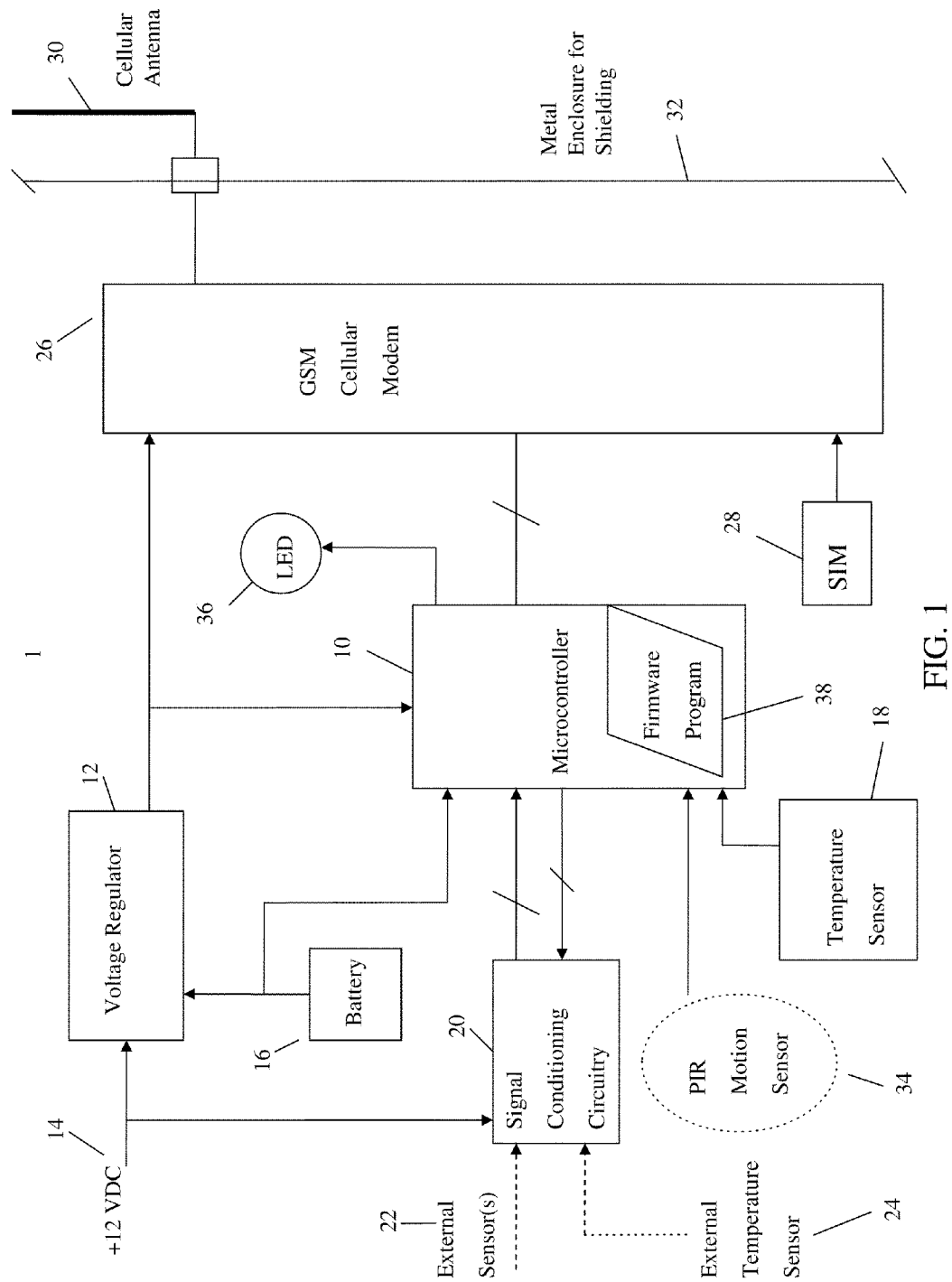
FIG. 1 is a block diagram of the present invention.

Environmental Monitoring System 1 Which Leverages A Social Networking Service To Deliver Alerts To Mobile Phones Or Devices comprises One or more sensors; A microcontroller 10; A wireless communications device configured to transmit wireless alerts to a social networking site. Referring now to the invention in more detail, in FIG. 1 there is shown a microcontroller 10 with embedded Firmware Program 38 controlling visual indicator such as an LED 36 and powered via Voltage Regulator 12, connected to either an external power source 14 or a Battery 16. The battery may be of any type providing a suitable voltage to power the Indicators and circuitry of the environmental monitoring system via the Signal Conditioning circuitry. The Signal Conditioning Circuitry 20 interfaces external power 14 or, the Battery 16 voltage, optional External Sensor(s) 22 and the optional External Temperature Sensor 24 to the Microcontroller 10. Integral Temperature Sensor 18 and optional PIR (Passive Infrared) Motion Sensor 34 are also interfaced to the Microcontroller 10. Connected to the Microcontroller 10 is a wireless communications interface comprised of GSM (Global System for Mobile Communications) Cellular Modem 26 and Cellular Antenna 30 with at least a portion of the antenna exposed outside a Metal Enclosure for Shielding 32, in order to enable wireless communications. Cellular network services are enabled via a SIM (Subscriber Identity Module) card 28 or other similar device. A Metal Enclosure for Shielding 32 covers most components except for external power 14, the Cellular Antenna 30, inherent to the wireless communications interface, and optional external Sensor(s) 22 and External Temperature Sensor 24. PIR Motion Sensor 34 is also partially enclosed by the Metal Enclosure for Shielding 32. In more detail, still referring to the invention of FIG. 1 the Microcontroller 10 executes the system's application from instructions within the Firmware Program 38 and measures the state of a complement of sensors including but not limited to: onboard Temperature Sensor 18, optional PR Motion Sensor 34, external +12 VDC 14, the Battery 16, and optional External Sensor(s) 22 and External Temperature Sensor 24. Optional External Sensor(s) 22 may comprise one or more of a humidity sensor, a water sensor, a water level sensor, a relay contact closure or a magnetic switch. Changes in any of these measurements may cause the Microcontroller 10 to transmit a digital text message such as an SMS (Short Messaging System, i.e. standard Text Message) alert via the wireless communication device comprised of the GSM Cellular Modem 26 and the Cellular Antenna 30. The SMS alert is addressed to a fixed telephone number or short code associated with a social networking service. This fixed address may be factory configured or hard-coded into the Firmware Program 38. Thus, no programming of interested parties' notification phone numbers is required. A flow chart of the Firmware Program 38 is shown in FIG. 2. It will be appreciated that phone numbers could also be input into the device by a user. One approach would be to configure these phone numbers via an SMS command, another would be for the device to capture the Caller ID information of an incoming circuit-switched call, or to use the phone number of a received SMS message. Yet still another method is for the phone number to be entered via a keypad attached to the device. Cellular network service for the device is enabled by SIM card 28, or similar device, which can be purchased from a GSM cellular carrier and installed in the GSM Cellular Modem 26. To transmit SMS text messages or wireless alerts via the cellular network a sufficiently strong cellular signal must be present in the area. The Cellular Antenna 30, inherent to the wireless communications device, must be located outside the Metal Enclosure for Shielding 32 to maximize the signal strength for the GSM Cellular Modem 26 to transmit wireless SMS alerts via the cellular network."

In addition to transmitting SMS alerts the wireless communication device, comprised of GSM Cellular Modem 26 and Cellular Antenna 30, may also receive and process SMS text messages or incoming circuit-switched calls. It will be appreciated that equivalents of the GSM Cellular Modem 26 and Cellular Antenna 30 may be employed and remain within the concept of the present invention. To generate temperature alerts the invention of FIG. 1 uses a novel approach which requires neither fixed nor user-configured temperature alarm thresholds. Rather, the system adopts the behavior of a social networking user by simply issuing a single alert to the social networking service whenever the temperature as measured by the Temperature Sensor 18 or the optional External Temperature Sensor 24 changes by some number of degrees. This delta criterion may be either hard-coded in the Firmware Program 38 or user-configurable. In this way the present invention enables a wireless temperature alert which avoids predefined or user-configured thresholds. Since the initial condition of the system is defined by the ambient temperature in which the system is powered on, and not defined by any circuitry in the device, any subsequent temperature alerts may occur at different temperatures between different power cycle events. It will be appreciated that this same approach may be taken with the interpretation of inputs from any sensor having a suitable output.

In the event that external power 14 is unavailable the Battery 16 will provide backup power to the system in order to maintain operation. The Microcontroller 10 will monitor the battery voltage and transmit an SMS alert if the battery capacity is below some minimum threshold.

Figure 2:
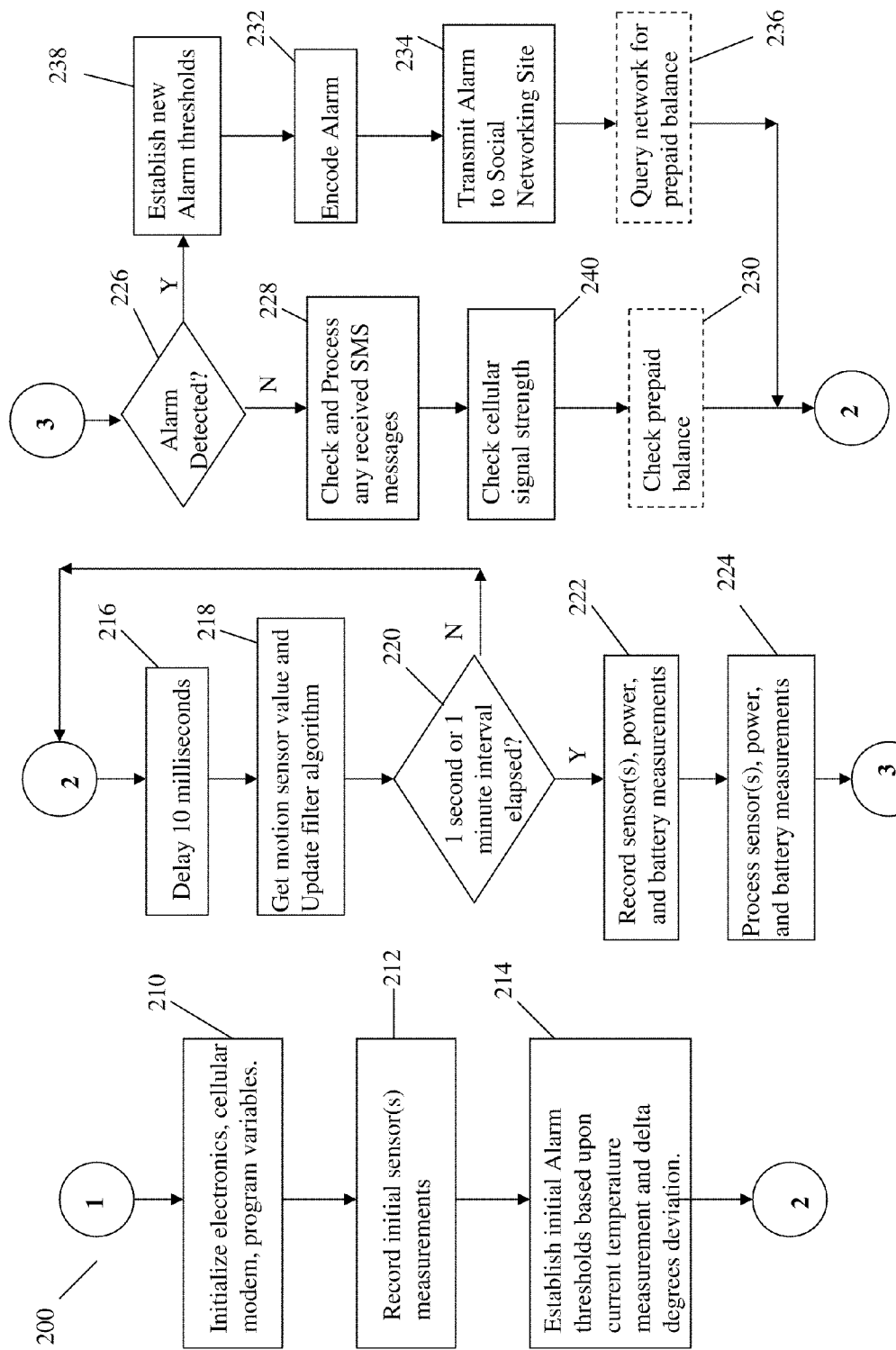
FIG. 2 is a flow chart of the firmware application program.

In further detail, still referring to FIG. 1 the Microcontroller 10 has an 8-bit word length and onboard at least 32 Kbytes of program ROM space and 1 Kbyte of RAM memory sufficient to store and execute the operating program and data structures for the remote monitoring application illustrated in FIG. 2. In particular, the Microcontroller 10 should have sufficient RAM memory buffer space to store an SMS text message of at least 160 bytes. The Microcontroller 10 also has onboard resources such as timers, A/D converter, serial and I/O ports sufficient for interfacing to the rest of the system electronics and supporting the program application. Persons possessing ordinary skill in the art of developing embedded systems will be familiar with the many different choices of low-cost, off-the-shelf, readily available microcontrollers that can be used to implement this design. They will also be able to accurately estimate the program size necessary to implement the functions of this invention as described herein. The embedded Firmware Program 38, which is illustrated in FIG. 2, would typically be written in C and assembly language.

The Voltage Regulator 12 must have enough capacity to provide pulse currents demanded by the GSM Cellular Modem 26 during SMS transmissions from a battery as small as a 9V alkaline.

If the largest dimension of the enclosure is smaller than ½ wavelength of the cellular frequency or the enclosure is metallic, then the Cellular Antenna 30, inherent to the wireless communication, must be located outside the Metal Enclosure for Shielding 32. For wall-mounted installations the Cellular Antenna 30 may be located within the wall cavity, concealing it from unauthorized personnel in order to prevent easy disabling of the wireless communications functionality.

The construction details of the invention are all electronics except the Battery 16, GSM Cellular Modem 26, Cellular Antenna 30, and SIM 28 are implemented on a single, double-sided printed circuit board.

The invention meets all required FCC and cellular carrier approvals and certifications. A Metal Enclosure for Shielding 32 may be necessary to ensure FCC radiated emissions compliance, so the Cellular Antenna 30, inherent to wireless communications, must be located outside the enclosure. To prevent this unsecured component from being compromised by unauthorized personnel the Cellular Antenna 30 may be attached to the bottom surface of the Metal Enclosure for Shielding 32 when the device is wall-mounted. This configuration will conceal the Cellular Antenna 30 within the wall cavity, decreasing the vulnerability of the invention to disablement by mechanical removal of the Cellular Antenna 30. Still another method to prevent the Cellular Antenna 30, inherent to the wireless communication, from being removed is to secure it with epoxy.

The advantages of the present invention include, without limitation, the ability for a plurality of interested parties, including other devices, to simultaneously receive remote environmental wireless alerts on their mobile devices via a social networking service. Direct communication from the device to the fixed address associated with a social networking service via commonly supported SMS text messages eliminates the need to configure alert notification addresses into the device. Propagation of the alert message from the social networking service to subscribers allows lower cost notification than existing alarm systems, since the device only incurs the charge to transmit a single wireless alert to the social networking service; all subscribers can then be forwarded the alarm message from the social networking service. In the case in which a follower is a similar device, this technique allows autonomous telemetry. For example, one device could sense a sensor changing state and communicate that event to the social networking site; another subscriber device could then act upon that information.

The present invention provides further advantage in that no user configuration of alarm threshold(s) is required. Because only a single wireless alert is transmitted to the social networking service when environmental conditions change at the location, regardless of the number of interested parties, or subscribers to the device, the present invention allows multiple temperature deviations to be communicated cost-effectively to interested parties without the need for explicit thresholds.

The location of the Cellular Antenna 30, outside the Metal Enclosure for Shielding 32, allows the system to be physically smaller than the Cellular Antenna 30 and/or allows the enclosure to be constructed of metal. A small enclosure offers the benefits of aesthetic or unobtrusive installation or protection of small personal property. A metal enclosure offers the benefits of protection of the internal electronics from burglars or unauthorized personnel and electromagnetic shielding of the internal electronics. An envisioned wall-mounted installation of the system could locate the Cellular Antenna 30 within the wall cavity, allowing a much smaller solution for enclosing the remaining portion of the wireless communications device while still preventing the system from being disabled by easy removal of the Cellular Antenna 30, inherent to the communications device.

In broad embodiment, the present invention is any type of portable, mobile or fixed wireless communication-based remote monitoring system which alerts a plurality of interested parties, including other devices, of environmental conditions by leveraging the social network to which they subscribe, avoiding the need for configuration of subscriber address information, and which further eliminates user-configured or fixed temperature alarm threshold circuitry or information.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The FIG. 2 flowchart of the Firmware Program 38 illustrates one exemplary method 200 for leveraging a social networking service to deliver an alarm to a plurality of receivers. In step 210 method 200 initializes all device electronics, initializes firmware program 38 variables, and powers on and initializes the GSM Cellular Modem 26. Step 212 of method 200 then records initial sensor readings corresponding to the Temperature sensor 18 and optionally the external temperature sensor 24 and optional external sensor(s) 22. It will be recognized that these sensor readings are not predefined, and are based upon the current environmental conditions at the moment the device is turned on. In step 214 of method 200, then, the initial sensor readings recorded in step 212 of method 200 are used to establish initial temperature and optional external environmental sensor thresholds. Step 226 of method 200 defines an alarm condition as a deviation by some fixed number of degrees from this initial measured temperature. After the initial environmental sensor conditions are set in step 214, step 216 of method 200 then implements an optional sampling delay. In one embodiment 10 milliseconds is used, although this sampling period could be changed based upon the digital sampling criteria needed for any associated optional sensor. After the delay implemented in step 216 of method 200 expires, step 218 of method 200 records the optional current PIR Motion Sensor 34 state and updates an associated sensor filtering algorithm. In step 220 of method 200 the firmware checks whether either a one second or one minute interval has elapsed. Although one second and one minute intervals are conveniently chosen for digital input and temperature sensor measurements, it will be recognized that other similar intervals could be chosen. If neither a one second nor one minute interval has elapsed, then step 216 of method 200 is executed, followed by step 218 of method 200. This loop will repeat until step 220 of method 200 determines that either a one second or 1 minute interval has elapsed. When step 220 of method 200 determines that a one second or 1 minute interval has elapsed, step 222 of method 200 will record one or more of temperature sensor 18, optional External Temperature Sensor 24, optional External Sensor (s) 22, Battery 16 level or external voltage 14 values. In step 224 of method 200 processing of these recorded values will occur. Step 226 of method 200 then examines the processed sensor, power and battery measurement values and determines if an Alarm condition exists. For the temperature sensors 18 and 24, an Alarm condition is defined as a deviation by some fixed number of degrees from an established threshold. If step 226 of method 200 determines that an Alarm condition exists, then step 238 of method 200 will establish new temperature thresholds for either temperature sensor 18 or optional external temperature sensor 24, if either of these was the cause of the Alarm. Step 232 of method 200 encodes the alarm, in one example as an SMS message, and step 234 of method 200 transmits the encoded alarm 312 to a social networking site 316. If the cellular account SIM 28, or similar device, used by the device in FIG. 1 is associated with an optional prepaid account, then optional step 236 of method 200 sends a query to the cellular network for the remaining prepaid balance. The response to the query will be received from the network some time later, and this will be checked for in step 230 of method 200. After step 236 of method 200 the program logic reverts to step 216 of method 200.

If step 226 of method 200 did not detect an Alarm condition, then step 228 of method 200 checks to see if an SMS message has been received by SIM 28. If so, step 228 of method 200 will process the received SMS message. Next, step 240 of method 200 checks the current cellular received signal strength. Optional step 230 of method 200 checks for a response from the cellular network to any previous queries of remaining prepaid balance.

Figure 3:
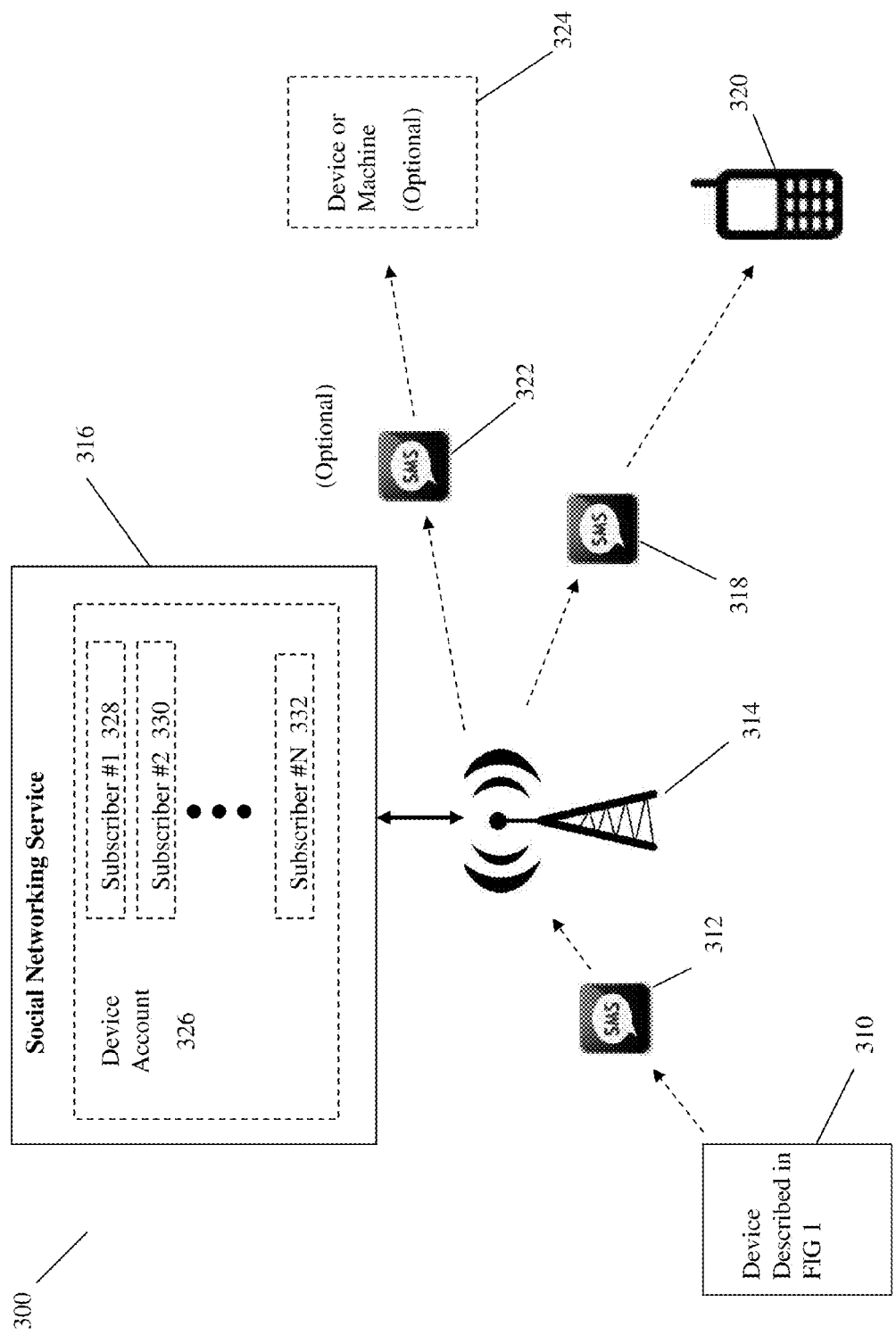
FIG. 3 is a diagram of the present invention leveraging a social networking service to deliver wireless alerts to mobile phones or devices.

FIG. 3 is a diagram of the present invention leveraging a social networking service to deliver wireless alerts to mobile phones or devices. The device described in FIG. 1 is shown in block 310 transmitting a wireless SMS alert 312 to the cellular network 314. Based upon the SMS short code destination of the wireless SMS alert message 312, it is routed by the cellular network 314 to the Social Networking Service 316. In one example the short code is 40404, which is the North American cellular short code for the Twitter social networking service. When the SMS alert message 312 is received by the Social Networking Service 316 it looks up the Device Account 326 associated with the device 310. The Social Networking Service then posts or stores the SMS alert message 312 in this Device Account 326. This completes the publication of the SMS alert message 312 to the Social Networking Service 316.

A Device Account 326 in the Social Networking Service 316 may have one or more optional Subscriber accounts 328, 330 . . . 332, associated with it. These Subscriber accounts 328, 330 . . . 332 may be associated with a user 320 or a Device or Machine 324. Any of the Subscriber Accounts 328, 330 . . . 332 which have subscriber preferences set to deliver the alert message 312 as a wireless SMS message will then cause the Social Networking Service 316 to deliver a copies 318 and optionally 322 of the SMS alert message 312 to interested followers 320 or optionally Devices or Machines 324. In the latter case, autonomous machine-to-machine (M2M) communications is thereby enabled by using the Social Networking Service 316 as an intermediary between publishing devices such as 310, and subscriber machines or devices, such as 324, which can then act upon the published information (for implementing control, in response to measured environmental conditions reported by publishing environmental monitoring devices, for example).

Figure 4:
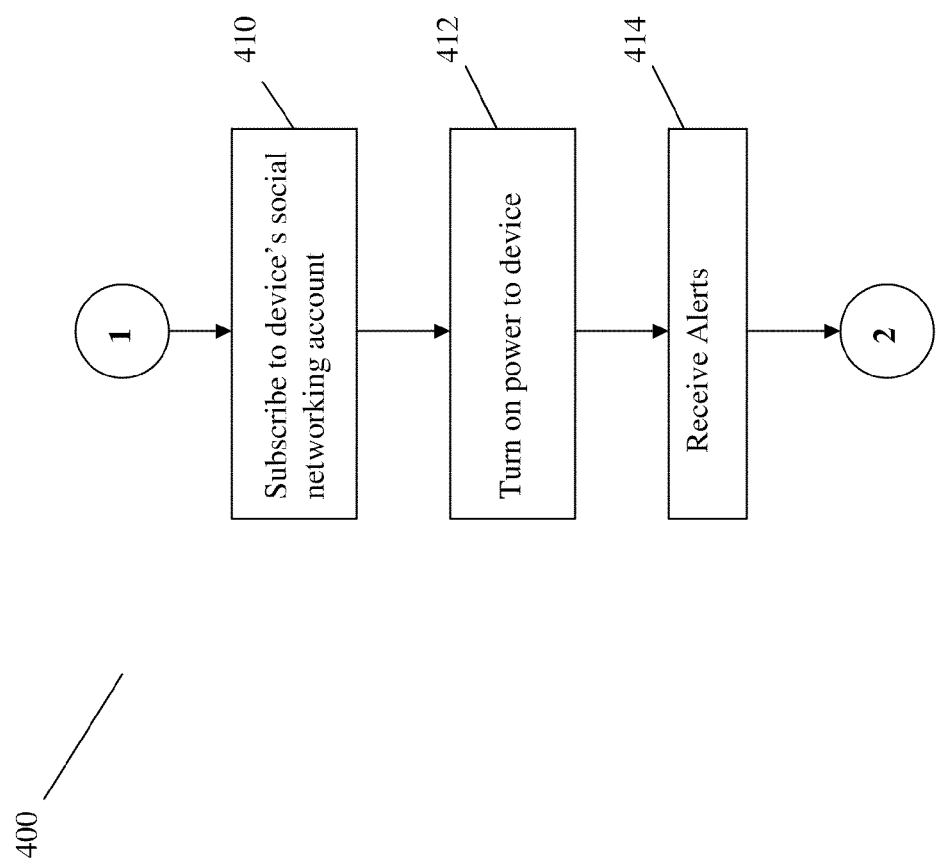
FIG. 4 is a diagram of the steps necessary to begin receiving alerts from the present invention.
Figure 5:
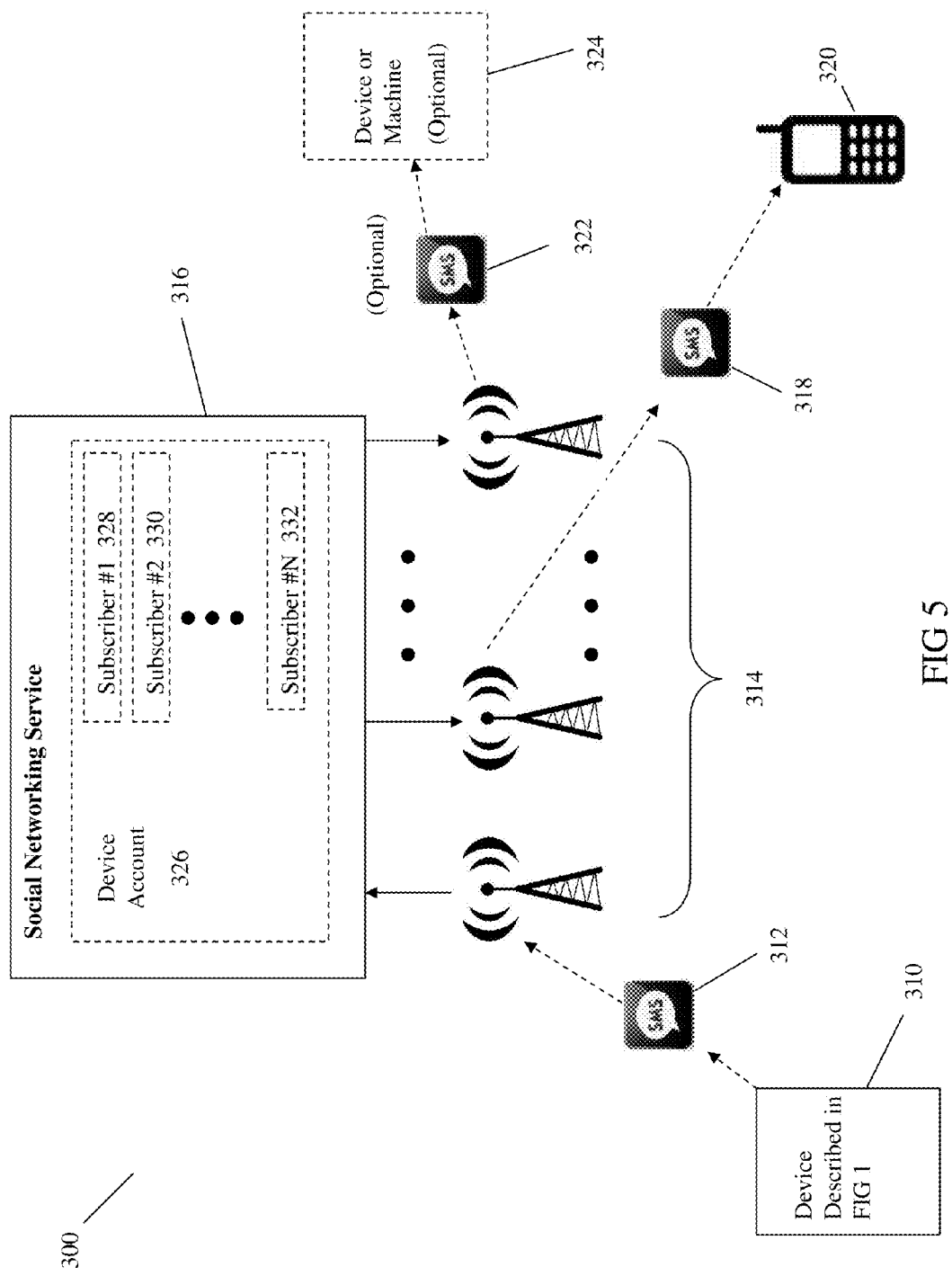
FIG. 5 is a diagram of the present invention leveraging a complex social networking service to deliver wireless alerts to mobile phones or devices.

FIG. 4 is a diagram of the steps necessary to begin receiving alerts from the present invention. In step 410 of method 400 a user of the device described in FIG. 1 subscribes to its social networking account. In one example the device described in FIG. 1 is configured to transmit wireless alerts to Twitter. A user of the device described in FIG. 1 can subscribe to its alerts by following the device's Twitter account and enabling wireless SMS alert notifications to his mobile device. In step 412 of method 400 the user turns on power to the device described in FIG. 1. The alarm system is now enabled whereby in step 414 of method 400 wireless alerts are now received by the user on his mobile phone.

I claim:

1. An environmental monitoring system for monitoring an environment, sensing a change in an environmental condition, and efficiently notifying subscribers of a social networking service account of the change in the environmental condition, the system comprising:
- a sensor configured to sense an environmental condition, including an initial environmental condition and a subsequent environmental condition;
- a microcontroller operatively coupled to the sensor, the microcontroller having a memory storing a measurable, predetermined environmental condition deviation, the microcontroller configured to dynamically establish system alarm thresholds based on the sensed environmental condition and the predetermined environmental condition deviation, including establishing an initial alarm threshold based on the initial environmental condition and the predetermined environmental condition deviation, and to determine whether the subsequent environmental condition sensed by the environmental sensor exceeds the initial alarm threshold; and
- a wireless communications device operatively coupled to, and co-located with, the microcontroller, the wireless communications device configured to transmit a wireless alert to a social networking site when the subsequent environmental condition exceeds the initial alarm threshold, causing the social networking site to publish the wireless alert to a social networking service account associated with the environmental monitoring system and having a plurality of subscribers to the social networking service account, the wireless alert including an indication of the change in the environmental condition;
- wherein the microcontroller is further configured to establish a subsequent alarm threshold to replace the initial alarm threshold when the subsequent environmental condition exceeds the initial alarm threshold, the subsequent alarm threshold based on the subsequent environmental condition and the measurable, predetermined environmental condition deviation, thereby allowing dynamic changes to system alarm thresholds.

2. The environmental monitoring system of claim 1 wherein only cellular short message service (SMS) messages addressed to a fixed address associated with the social networking site are used to transmit the alert to the social networking site, and transmitting SMS messages relating to the alert to the plurality of subscribers.

3. The environmental monitoring system of claim 1 wherein at least partially concurrent notification of a plurality of users is achieved by the social networking site transmitting copies of the wireless alert to subscribers of the social networking service account.

4. The environmental monitoring system of claim 1 wherein a plurality of users receive the wireless alert by subscribing to the social networking service account.

5. The environmental monitoring system of claim 4 wherein only cellular short message service (SMS) messages addressed to a fixed address associated with the social networking site are used to transmit the wireless alert to the social networking site, and transmitting SMS messages relating to the alert to the plurality of subscribers.

6. The environmental monitoring system of claim 4 wherein at least partially concurrent notification of a plurality of users is achieved by the social networking site transmitting copies of the wireless alert to subscribers of the social networking service account.

7. The environmental monitoring system of claim 5 wherein at least partially concurrent notification of a plurality of users is achieved by the social networking site transmitting copies of the wireless alert to subscribers of the social networking service account.

8. The environmental monitoring system of claim 1 wherein the social networking site is selected from the group of social networking sites consisting of Twitter and Facebook.

9. The environmental monitoring system of claim 1 wherein the social networking site is a publish-subscribe network.

10. A method of sending an alarm comprising the steps of:
a) Sensing an initial environmental condition and a subsequent environmental condition;
b) Establishing an initial alarm threshold based on the initial environmental condition and a predetermined environmental condition deviation;
c) Detecting an initial alarm condition, the initial alarm condition occurring when the sensed subsequent environmental condition exceeds the initial alarm threshold;
d) Establishing a subsequent alarm threshold based on the subsequent environmental condition that exceeded the initial alarm threshold and on the predetermined environmental condition deviation, allowing dynamic changes to system alarm thresholds;
e) Encoding the initial alarm condition into one or more encoded alarm condition messages;
f) Transmitting at least one of the encoded alarm condition messages to a social networking site via one or more wireless alerts, wherein at least one of the wireless alerts is created at a monitored site by a co-located wireless communication device and a microcontroller cooperating to transmit said wireless alerts, the alarm condition defined without user interaction, and wherein said social networking site publishes the alarm condition message to a social networking service account associated with the wireless communication device, the social networking service account having a plurality of subscribers;
g) Alerting a receiver of said alarm condition via the social networking site transmitting a copy of the alarm condition message to subscribers of the social networking service account.

11. The method of claim 10 wherein the receiver is a mobile phone.

12. The method of claim 10 wherein the receiver is a device or a machine having a subscription to the social networking service account.

13. The method of claim 10 wherein only cellular short message service (SMS) messages addressed to a fixed address associated with the social networking site are used to transmit the wireless alerts to said social networking site and wherein the social networking site transmitting a copy of the alarm condition message to subscribers of the social networking service account comprises the social networking site transmitting an SMS message.

14. The method of claim 10, further comprising the steps of a sensing an environmental condition that exceeds the subsequent alarm threshold after sensing the subsequent condition, and transmitting a subsequent encoded alarm condition message to the social networking site.

15. A method of receiving wireless environmental alerts from a remote location comprising the steps of:
a) Subscribing to a social networking service account of a device that includes an environmental sensor configured to sense an environmental condition, including an initial environmental condition and a subsequent environmental condition, a microcontroller coupled to the sensor, and a wireless transmitter coupled to the microcontroller, the microcontroller having a memory storing a measurable, predetermined environmental condition deviation, the microcontroller configured to dynamically establish system alarm thresholds based on the sensed environmental condition and the predetermined environmental condition deviation, including establishing an initial alarm threshold based on the initial environmental condition and the predetermined environmental condition deviation, and to determine whether a subsequent environmental condition sensed by the environmental sensor exceeds the initial alarm threshold, and to establish a subsequent alarm threshold to replace the initial alarm threshold when the subsequent environmental condition exceeds the initial alarm threshold, the subsequent alarm threshold based on the subsequent environmental condition and the measurable, predetermined environmental condition deviation, thereby allowing dynamic changes to system alarm thresholds;

b) Placing the device at a remote location having the environmental condition;

c) Turning on the device;

d) Receiving wireless alerts on a mobile device whereby no additional configuration steps are needed, the wireless alerts being created and transmitted to a social networking site associated with the social networking service account by the device, and including a first alert corresponding to the initial alarm threshold being exceeded and a second alert corresponding to the subsequent alarm threshold being exceeded.

16. The method of claim 15 further comprising the step of connecting power to the device.

17. The method of claim 15 further comprising the step of checking for adequate signal strength level.

18. A system for machine-to-machine communications, comprising:

a) A first device associated with a first social networking account and having an environmental sensor configured to sense an environmental condition at a monitored site of the first device, the first device publishing a first alarm update to a social networking site, wherein the first alarm update is created and sent by an environmental alarm system located at the monitored site when the environmental condition at the monitored site sensed by the environmental sensor exceeds an initial alarm threshold based on an initial environmental condition and a measurable, predetermined environmental condition deviation and the first device publishing a second alarm update to the social networking site when the environmental condition sensed by the environmental sensor exceeds a subsequent alarm threshold, the subsequent alarm threshold established as being equal to the initial alarm threshold plus the measurable, predetermined environmental condition deviation, allowing dynamic changes to system alarm thresholds; and b) A second device at a remote location subscribing to updates from the first device, whereby information is transferred from the first device to the second device by the social networking service of the social networking site, the second device configured to take an action based upon the first or the second alarm update.

19. The system of claim 18 wherein only cellular short message service (SMS) messages addressed to a fixed address associated with the social networking site are used to transmit the alarm updates to the social networking site and the alarm updates are transmitted as SMS messages to the second device by the social networking site.

20. The system of claim 19 wherein the environmental alarm system includes a microcontroller configured to utilize configuration information contained in a received SMS message to reconfigure a setting of the environmental alarm system.

21. An environmental monitoring system for monitoring an environment and sensing a change in an environmental condition comprising:

a sensor configured to sense an environmental condition, including an initial environmental condition and a subsequent environmental condition;

a microcontroller operatively coupled to the sensor, the microcontroller having a memory storing a measurable, predetermined environmental condition deviation, the microcontroller configured to dynamically establish system alarm thresholds based on the sensed environmental condition and the predetermined environmental condition deviation, including establishing an initial alarm threshold based on the initial environmental condition and the predetermined environmental condition deviation, and to determine whether the subsequent environmental condition sensed by the environmental sensor exceeds the initial alarm threshold, and to establish a subsequent alarm threshold to replace the initial alarm threshold when the subsequent environmental condition exceeds the initial alarm threshold, the subsequent alarm threshold based on the subsequent environmental condition and the measurable, predetermined environmental condition deviation, thereby allowing dynamic changes to system alarm threshold;

a wireless transceiver operatively coupled to, and co-located with, the microcontroller, the wireless transceiver configured to transmit a first wireless alert including an indication that the subsequent environmental condition has exceeded the initial alarm threshold in the form of an SMS message to a social networking site, the transmitted wireless alert causing the social networking site to publish the wireless alert to a social networking service account associated with the environmental monitoring system, the social networking service account having a plurality of subscribers to the social networking service account, including at least one user and at least one machine, the at least one machine configured to take an action based upon the received alert message, the wireless transceiver also configured to receive an SMS message.

22. The environmental monitoring system of claim 21, wherein the microcontroller is further configured to utilize configuration information contained in the received SMS message to reconfigure a parameter of the system.

23. The environmental monitoring system of claim 22, wherein the SMS message includes a telephone number of a subscriber or a user to receive the wireless alert.

24. The environmental monitoring system of claim 21, wherein the system further comprises a SIM card associated with a unique telephone number.

* * * * *